United States Patent
Fayyad et al.

[11] Patent Number: 6,088,639
[45] Date of Patent: Jul. 11, 2000

[54] METHOD OF ENABLING AND DISABLING OCCUPANT RESTRAINTS

[75] Inventors: Salem Ahmad Fayyad, Ann Arbor, Mich.; Michael K Walden, Noblesville, Ind.; David Martin Spell, Kokomo, Ind.; Sheri Lynn Patterson, Greentown, Ind.

[73] Assignee: Delco Electronics Corporation, Kokomo, Ind.

[21] Appl. No.: 08/943,703

[22] Filed: Oct. 3, 1997

[51] Int. Cl.[7] .................................................. B60Q 1/00
[52] U.S. Cl. .......................... 701/45; 180/282; 180/271; 280/735; 340/438; 340/436; 340/901; 340/904
[58] Field of Search .................................. 340/436, 438, 340/901, 904; 280/732, 734, 735; 180/282, 273, 271; 701/45

[56] References Cited

U.S. PATENT DOCUMENTS

| | | | |
|---|---|---|---|
| 4,243,971 | 1/1981 | Suchowerskyj et al. | 340/436 |
| 5,107,245 | 4/1992 | Gesper et al. | 340/436 |
| 5,232,243 | 8/1993 | Blackburn et al. | 280/735 |
| 5,324,074 | 6/1994 | Christian et al. | 280/732 |
| 5,428,340 | 6/1995 | Kawabata et al. | 280/735 |
| 5,528,698 | 6/1996 | Kamei et al. | 280/735 |
| 5,544,914 | 8/1996 | Borninski et al. | 280/735 |
| 5,794,972 | 8/1998 | Katzin | 280/735 |
| 5,821,631 | 10/1998 | Loraas et al. | 340/426 |
| 5,851,025 | 12/1998 | Gamboa | 280/735 |

FOREIGN PATENT DOCUMENTS

| | | | |
|---|---|---|---|
| 4410402 | 9/1994 | Germany | 280/735 |

*Primary Examiner*—Brent A. Swarthout
*Attorney, Agent, or Firm*—Jimmy L. Funke

[57] ABSTRACT

A controller for airbags and seat belt pretensioners stores a digital flag for each restraint to enable or disable the corresponding deployment loop. A diagnostic tester is coupled by a communications link to the controller to selectively set the flags as desired. The controller stores a seed and a key and the tester is provided with an algorithm which can calculate the key from the seed. The tester requests the seed, which is supplied, and then calculates the key and sends the key to the controller along with a request to set the status of the deployment loops. If the transmitted key matches the stored key, the controller will comply with the request and set the flags accordingly.

7 Claims, 1 Drawing Sheet

METHOD OF ENABLING AND DISABLING OCCUPANT RESTRAINTS

FIELD OF THE INVENTION

This invention relates to supplemental restraint systems (SIRs) and particularly to a method for selectively enabling and disabling airbags or other restraints.

BACKGROUND OF THE INVENTION

SIR systems used in automotive vehicles commonly have a plurality of airbags to provide frontal protection and side protection for both passenger and driver positions, and in some cases, seat belt pretensioners. In at least some jurisdictions it is considered to be desirable to offer an option to suppress or disable one or more of the airbags by authorized service personnel. It is desirable to have an indicator viewed by the operator which shows the state of each airbag as well as to have a permanent record of an airbag disabled state in the event of a crash. In order to prevent inadvertent deployment, it is also desirable to disable the airbags during servicing or vehicle assembly.

Although it is known to provide airbag control systems with switches operable by the vehicle operator or by authorized service technicians for disabling one or more airbags, this additional hardware and associated changes in existing systems would be unnecessary if software changes could readily be made in the airbag controller.

SUMMARY OF THE INVENTION

It is therefore an object of the invention to selectively enable and/or disable one or more occupant restraints on a vehicle without hardware changes. Another object is to afford a visual and/or audible alert of restraint disabling.

A controller is connected to a number of airbags or other restraints through individual deployment loops, and activates some or all of the restraints during a crash event which is sufficiently severe to warrant deployment. Digital flags stored in the controller are used to enable or disable each deployment loop. A diagnostic tester, linked to the controller via a communications bus, is used to set the state of each flag.

The diagnostic tester sends messages to and receives messages from the controller to effect setting of the status of the deployment loops. The tester contains an algorithm which can calculate a key value from a seed. The controller contains both the seed and the key, and will send the seed to the tester upon request. If the tester correctly calculates the key and sends it to the controller, the transmitted key will match the key stored in the controller to confirm that the tester is authorized to makes status changes. The tester sends a string of bits representing the loop states and the controller stores those bits as flags to thereby enable or disable selected loops.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
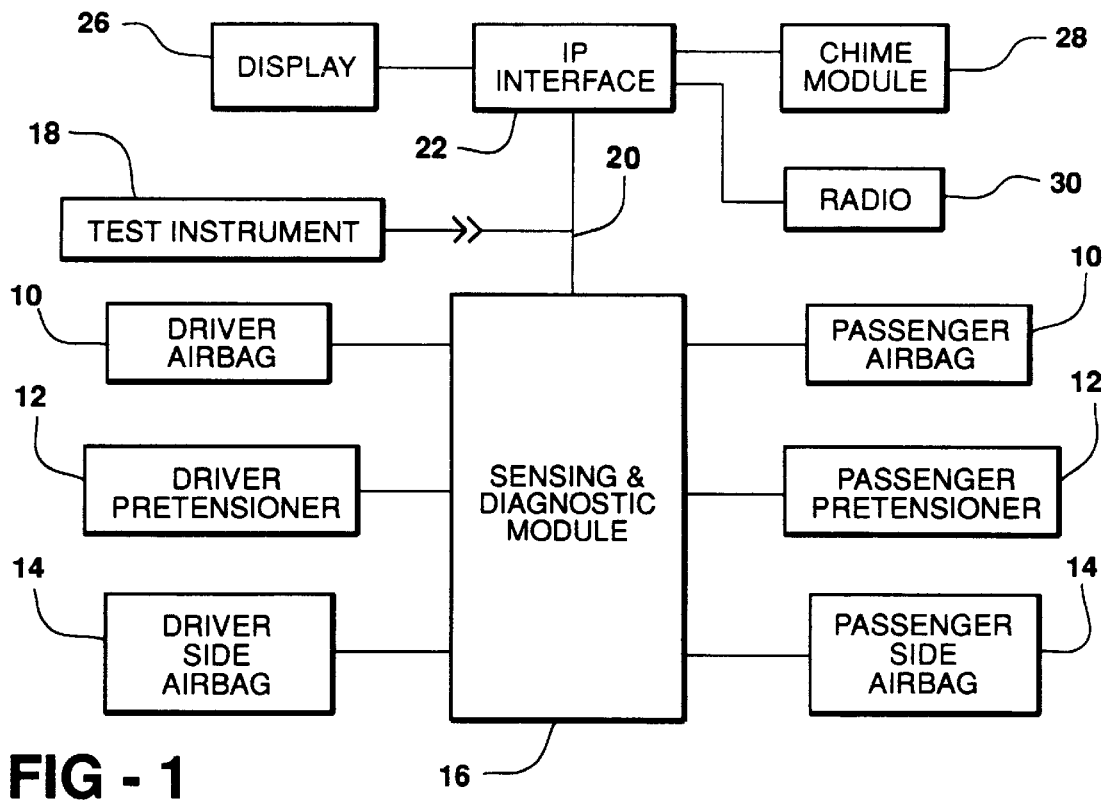
FIG. 1 is a schematic diagram of a vehicle restraint system including a display and a diagnostic tester used for programming the system.

While various restraint arrangements are employed on various vehicles, the invention applies to any configuration. The FIG. 1 configuration is exemplary and includes a frontal airbag 10, a side airbag 14 and a seat belt pretensioner 12 on the driver side and on the passenger side of the vehicle. The energizing electrical path from the controller and to each restraint is termed a deployment loop. Any or all of the restraints may be deployed in a given crash situation according to the acceleration experienced by the vehicle sensors and the determination made by the associated controls. The restraints 10,12, and 14 are each subject to deployment by a microprocessor-based controller 16, often called a sensing and diagnostic module. The microprocessor can store a flag for each restraint to enable or disable the individual deployment loops.

Communication between the controller 16 and other parts of the vehicle or with a diagnostic tester 18 is carried out by a communication interface 20. An instrument panel interface 22 is connected to the communication interface 20 to supply status signals to a display 26, a chime module 28 and/or a radio 30. The display may be, for example, a graphic illustrating the restraints at various parts of the vehicle with colored lights to indicate the status of each. The chime or radio can be used to annunciate an audible warning upon each vehicle start-up if a restraint is disabled.

The communications interface can take many forms. One example uses ALDL (Assembly Line Diagnostic Link) communications. An instrument panel driver could request, using ALDL communications, the restraint status from the controller 16 and then activate the display. Another example, is a lamp driver within the controller 16 which is directly wired to the display. A third example is a class 2 or CAN (controller area network) which enables direct coupling to the test instrument as shown in FIG. 1. A CAN bus already exists in many vehicles and is coupled to the controller 16. An additional message could be added to communicate the enabled/disabled status of the deployment loops.

The diagnostic tester 18, plugs into the communications interface 20 and is commonly used by service personnel in the diagnosis of various vehicle systems. It is a microprocessor based device which communicates digitally with each system. As applied to the controller 16, the diagnostic tester 18 sends and receives messages to effect setting of the status of the deployment loops. The tester contains an algorithm which can calculate a key value from a seed. The controller 16 contains both the seed and the key, and will send the seed to the tester upon request. If the tester correctly calculates the key and sends it to the controller, the key values will match to confirm that the tester is authorized to makes status changes. The tester sends a string of bits representing the loop states and the controller stores those bits to thereby enable or disable selected loops.

Figure 2:
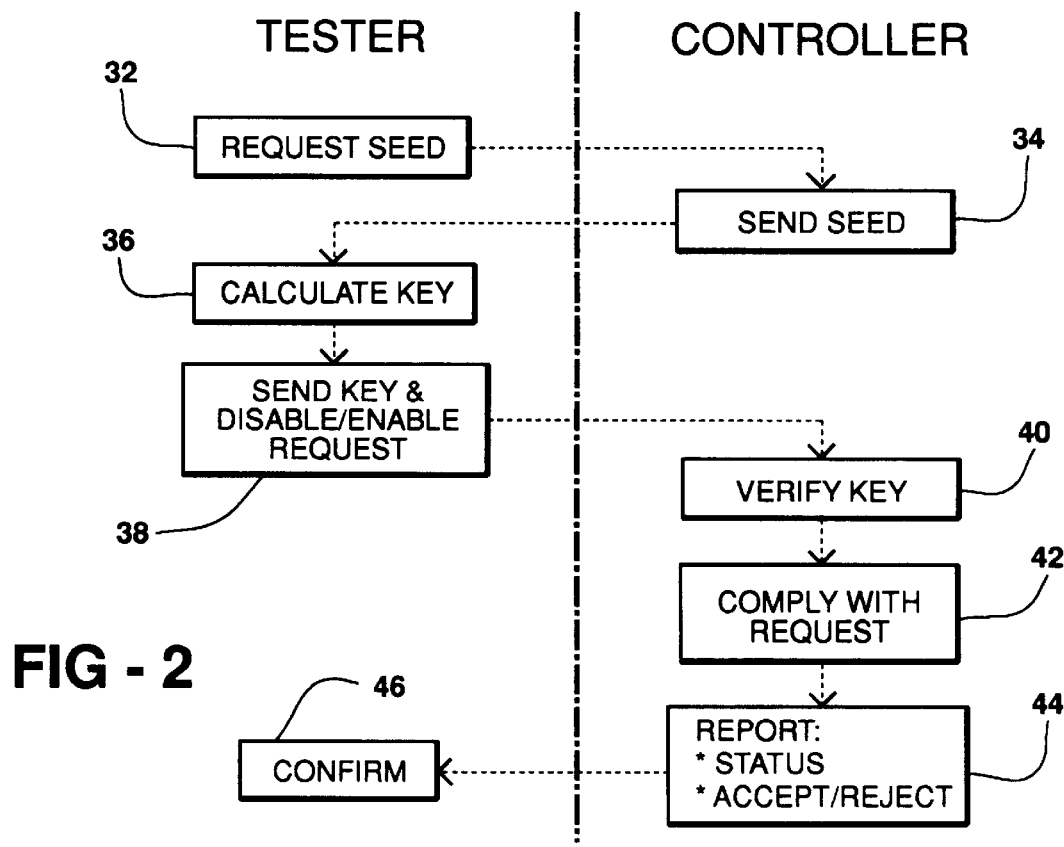
FIG. 2 is a flow chart illustrating the software method of setting the desired status of each restraint.

The process of setting the flags for the deployment loops is illustrated in the form of a flow chart in FIG. 2. The functional description of each block in the chart is accompanied by a number in angle brackets <nn> which corresponds to the reference number of the block. Some of the steps are performed in the tester 18 and the others in the controller 16. The tester initiates the process by sending a request for a seed <32>. In response, the controller sends a seed <34>. The tester then applies its stored algorithm to the seed to calculate the key <36> and then sends the key to the controller <38>. The controller verifies the key by comparing it to the stored key value of the key <40> and if the keys match, complies with the request by setting the flag for each deployment loop according to the request <42>. The controller further sends a report to the tester which includes the flag status and whether the request was accepted or rejected <44>. Finally the tester confirms the report <46>.

The messages sent between the tester and the controller comprise several bytes of data formatted according to the protocol of the chosen communications link. A preferred form of the enable/disable request is a single byte wherein the state of each bit corresponds to the desired status of a corresponding deployment loop as shown in the following table.

| Bit | Loop |
| --- | --- |
| 0 | Spare |
| 1 | Spare |
| 2 | Passenger Side Airbag |
| 3 | Driver Side Airbag |
| 4 | Passenger Pretensioner |
| 5 | Driver Pretensioner |
| 6 | Passenger Front Airbag |
| 7 | Driver Front Airbag |

The diagnostic tester is available to all authorized service technicians. The vehicle owner or operator may then have any restraint enabled or disabled to achieve a desired configuration. Another advantage of this method of disabling and enabling the deployment loops is that the flags may all be set to disabled during vehicle manufacture so that inadvertent deployment can not occur during assembly of the vehicle. The flags may then be set to the enabled state after assembly or to a desired state upon delivery to a customer.

One function of the controller is to periodically diagnose the deployment loops for faults. This function is not impeded by the disable flags so that normal diagnosis continues. Another desired function is to store the status code in a nonvolatile memory or crash record in the event of a crash which calls for deployment of any loop. For this purpose the status is stored in an EEPROM when a crash event is detected.

It will thus be seen that the software method of individually controlling the deployment loops is readily carried out with existing hardware and allows any vehicle operator or owner to have the restraint system customized according to their needs.

The embodiments of the invention in which an exclusive property or privilege is claimed are defined as follows:

1. In a vehicle having a controller for deploying occupant restraints and a data link for communication between the controller and a diagnostic tester, a method of selectively enabling and disabling individual restraints comprising the steps of:

storing a key algorithm in the diagnostic tester;

storing a key code and a seed in the controller;

requesting the seed by the diagnostic tester;

sending the seed to the diagnostic tester;

operating on the seed by the key algorithm to calculate a key code;

sending the calculated key code to the controller along with a request for selective enabling and disabling of restraints;

verifying the key code; and when the key code is valid, enabling and disabling restraints according to the request.

2. The method defined in claim 1 wherein:

the request for selective enabling and disabling of restraints includes a string of bits, each bit corresponding to a particular restraint and being encoded for enabling or disabling.

3. The method defined in claim 1 further including the step of reporting to the diagnostic tester whether the request has been accepted or rejected.

4. The method defined in claim 1 further including the steps of:

reporting to the diagnostic tester whether the request has been accepted or rejected; and reporting the status of each restraint.

5. The method defined in claim 1 further including the steps of:

initially disabling the restraints during or prior to vehicle installation to prevent deployment during vehicle assembly; and selectively enabling and disabling restraints after vehicle assembly.

6. The method defined in claim 1 wherein the vehicle includes a display for indicating the status of each restraint, the method further including the steps of:

retrieving status data of the restraints from the controller; and energizing the display in response to the retrieved status data to indicate the status of each restraint.

7. The method defined in claim 1 wherein the vehicle includes a device for audibly annunciating the disabled status of a restraint, the method further including the steps of:

retrieving status data of the restraints from the controller; and energizing the device in response to the retrieved status data to audibly indicate a disabled status of a restraint.

* * * * *